United States Patent

[11] 3,597,825

[72] Inventor Karl Heinz Meislitzer
 Winnipeg, Manitoba, Canada
[21] Appl. No. 879,149
[22] Filed Nov. 24, 1969
[45] Patented Aug. 10, 1971
[73] Assignee Globelite Batteries Canada Limited
 Scarborough, Ontario, Canada

[54] BATTERY BURNING AND BOXING MACHINE
 6 Claims, 6 Drawing Figs.
[52] U.S. Cl. .................................................. 29/204
[51] Int. Cl. .................................................. H01m 35/18,
 B23p 19/04
[50] Field of Search .......................................... 29/204, 204
 D, 203, 203 L, 211 L

[56] References Cited
 UNITED STATES PATENTS
3,061,913 11/1962 Schenk, Jr. .................. 29/204

*Primary Examiner*—Thomas H. Eager
*Attorney*—Douglas S. Johnson

ABSTRACT: An apparatus for the assembly of lead-acid storage batteries wherein all of the plate groups are assembled into pockets in the upper part of the apparatus so that the dimensional relationships between the plate groups are as they will be when assembled into a battery box. Jig plates secure the groups of plate lugs so that they may be burned to form bus bars and also so that intercell connectors and battery posts may be assembled to the plate groups and burned simultaneously therewith. The then completely assembled electrical components of the battery are pushed downwardly into a waiting battery box to which only the electrolyte and battery cover need be added to have a completely assembled and operative lead-acid battery.

Patented Aug. 10, 1971

INVENTOR.
KARL H. MEISLITZER

BY Douglas S. Johnson

Attorney

INVENTOR.
KARL H. MEISLITZER
BY Douglas S. Johnson
Attorney

INVENTOR.
KARL H. MEISLITZER
BY Douglas S. Johnson
Attorney 3,597,825

BATTERY BURNING AND BOXING MACHINE

FIELD OF THE INVENTION

This invention relates to an apparatus for assembling batteries, most particularly lead-acid storage batteries. More specifically, the invention teaches an apparatus in which lead-acid storage batteries may be completely assembled except for the battery case cover.

The assembly of lead-acid storage batteries has normally involved a number of different manufacturing steps and considerable handling and manipulation of the various elements which go into each battery. It must be recalled that in each cell group in a lead-acid storage battery there is a plurality of positively and negatively charged plates, in staggered relationship with each adjacent pair of plates having a separator between them; and an assembled cell group may comprise anywhere from half a dozen to better than a dozen plates, separators, etc. Each cell group is so assembled that each of the positive plates in the group is electrically connected to the other positive plates, and similarly, the negative plates are all connected together. The connecting of the positive or negative plates within a cell group is accomplished in a manufacturing step known as "burning," so that the tab formed on each plate is connected to a similar tab on a similar plate within the group. The burning is done in an apparatus specifically designed for that purpose.

DISCUSSION OF THE PRIOR ART

In the lead-acid storage battery manufacturing art, the term "burning" denotes the step whereby portions of certain of the battery elements which are made of lead or an alloy thereof, are exposed to an open flame so that the exposed portions may liquefy. Normally the battery elements are placed in a jig so that as the molten lead runs it is held in a pool, and upon removal of the open flame the molten lead resolidifies and the desired connection between the elements is made. Usually, it is necessary to add additional molten lead during a burning operation by exposing a bar of lead to the open flame at the same time.

After the cell groups are assembled, the next usual manufacturing step is to place a number of cell groups (usually 3 or 6 for 6-volt or 12-volt lead-acid storage batteries respectively) in a battery case. The intercell connections are then made so that the individual cell groups are series connected within the battery case. Battery posts are added, and the assembled cell groups within the battery case are then ready for assembly of the battery case cover thereto, and the addition of the electrolyte.

The assembly of the individual cell groups is usually performed as one manufacturing step at a specific station in the factory. The assembled battery cell groups are then collected from the stations whereat they are assembled, and are inserted into the battery cases for the burning operations whereby the intercell connections are made and the battery posts added. It is thus seen that the various battery elements have to be handled several times; and it has been noted that the reject rate of assembled batteries due to damage to the elements because of the handling, or damage to the battery case during the burning operations, has always been fairly high. Of course, the price of the lead-acid storage battery as it is sold from the factory must be such as to recover the losses in labor and materials which are the consequence of the reject rate.

There have been varying degrees of automation of lead-acid storage battery manufacture, but even the more automated apparatus which has been previously developed has duplicated the manipulative steps of former, less automated processes; that is, the cell groups may have to be handled several times before they are finally assembled into the battery box. Some more recent examples of apparatus which has been developed for use in the lead-acid storage battery manufacturing art are the machines taught in Sabatino et al. Canadian Pat. Nos. 703,963 and 743,025 issued Feb. 16, 1965 and Sept. 20, 1966 respectively. Other examples of prior art assembly jigs, burning apparatus and casting apparatus include U.S. Pat. No. 2,516,546 issued July 25, 1950 to C.S. Brown; U.S. Pat. No. 2,764,115 issued Sept. 25, 1956 to V.G. Korfhage et al.; and U.S. Pat. No. 2,799,905 issued July 23, 1957 to A.D. Vieth.

SUMMARY OF THE INVENTION

The apparatus of the present invention provides a single station in a lead-acid storage battery manufacturing facility whereat the individual cell groups may be assembled, and where the intercell connections are made and the battery posts installed. All burning operations are therefore made at the one place, and the interconnected cell groups and battery posts are assembled into the battery case so that the assembled battery elements leaving the apparatus of this invention comprise an entire lead-acid storage battery exclusive of the battery case cover and the electrolyte.

The apparatus of the present invention is, therefore, a group burning and boxing apparatus; that is, one in which all burning operations are made and in which the battery elements are boxed into the battery case.

It is an object of this invention to provide an apparatus as described immediately above.

It is a feature of the apparatus according to this invention that it may be manually operated or adapted to various degrees of automation.

It is a further object of this invention to provide a group burning and boxing apparatus for lead-acid storage battery manufacture which can be adapted to permit the assembly of various sizes and ratings of lead-acid storage batteries having differing numbers of battery cell groups and having different numbers of plates within each cell group, as compared with other batteries having different ratings or sizes.

A still further object of this invention is to provide a novel means whereby intercell connections in an assembled lead-acid storage battery may be easily made.

A still further object of this invention is to provide a novel process whereby all burning operations including the assembly of the individual battery groups and the interconnection of the plates therein, the intercell connection, and the assembly of the battery posts to the assembled battery cell groups may be accomplished at one time and with a single burning operation.

BRIEF DESCRIPTION OF THE DRAWING

These and other features and objects of this invention are discussed in greater detail hereafter in association with the accompanying drawings, in which.

Figures 1, 1A:
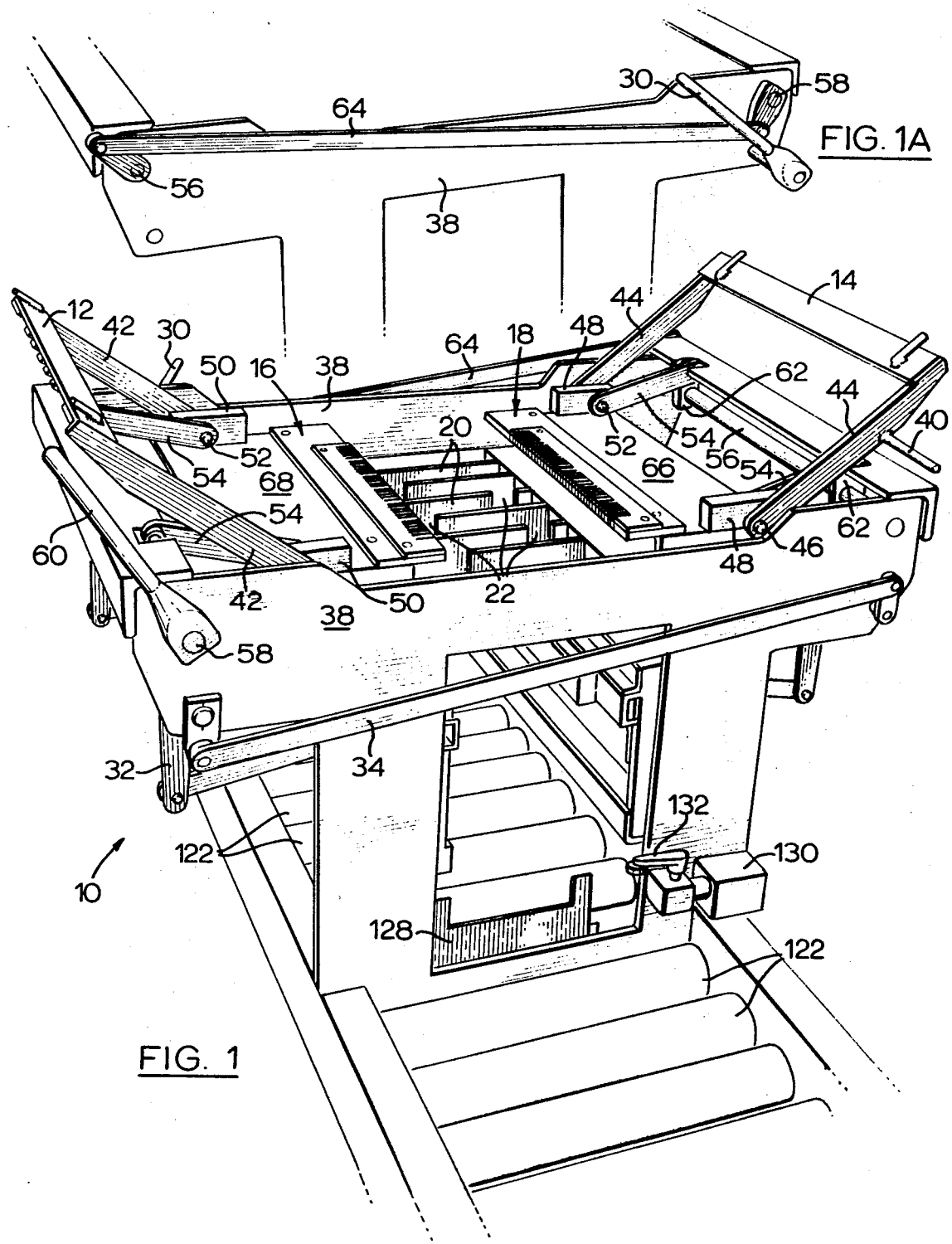
FIG. 1 is a perspective view of a group burning and boxing machine according to this invention.
FIG. 1A is a detail at the opposite end of the apparatus shown in FIG. 1.

The apparatus shown in the drawings is a manually operated apparatus, but it may be readily adapted to automatic operation as is discussed in greater detail hereafter. In the description which follows, the same reference numerals will identify the same element as it may be shown in any of the FIGURES.

DESCRIPTION OF THE PREFERRED EMBODIMENT

Essentially, the apparatus of this invention is so designed that, with the proper guide pieces etc. as will be discussed hereafter, any lead-acid type storage battery may be assembled therein. Thus, individual cell groups are placed in their respective places in the apparatus and with the proper orientation so that they may be aligned using the apparatus; and thereafter all burning operations, including the provision of the intercell connections and the battery posts may be performed, followed by the placing of the interconnected battery cell groups into the battery box. It is immaterial whether or not the battery plates are preformed, i.e. intended for installation in a 'dry charged' battery, although preformed plates take greater care in handling and are usually formed in cell groups. The apparatus can be readily adapted to accommodate any number of cell groups to be assembled into the battery, although six cell groups for a 12-volt battery is the usual case; and the apparatus is likewise readily adaptable to the number of plates per cell group.

The apparatus 10 basically comprises a pair of guides 12 and 14 which are intended to overlie one another and which cooperate with a pair of dams 16 and 18 so that the cell groups may be aligned and the entire burning operation performed. The group burning and boxing apparatus 10 has upper and lower portions; the upper portion being that portion of the machine in which all of the cell group assembly and the burning operations are performed, and the lower portion being that portion of the machine through which the battery boxes pass and where the assembly of the interconnected cell groups into the battery boxes is made.

The apparatus illustrated in the drawings is taken from a specific example, being that which is intended for a 12-volt battery having six cell groups, each of which cell groups comprises six negative plates and five positive plates. The cell groups are assembled in such a manner that the negative and positive battery terminal posts are on the same side of the battery when viewed from the top. The operation of the apparatus is the same, or virtually the same, for any lead-acid storage battery which may be assembled therein.

Figure 2:
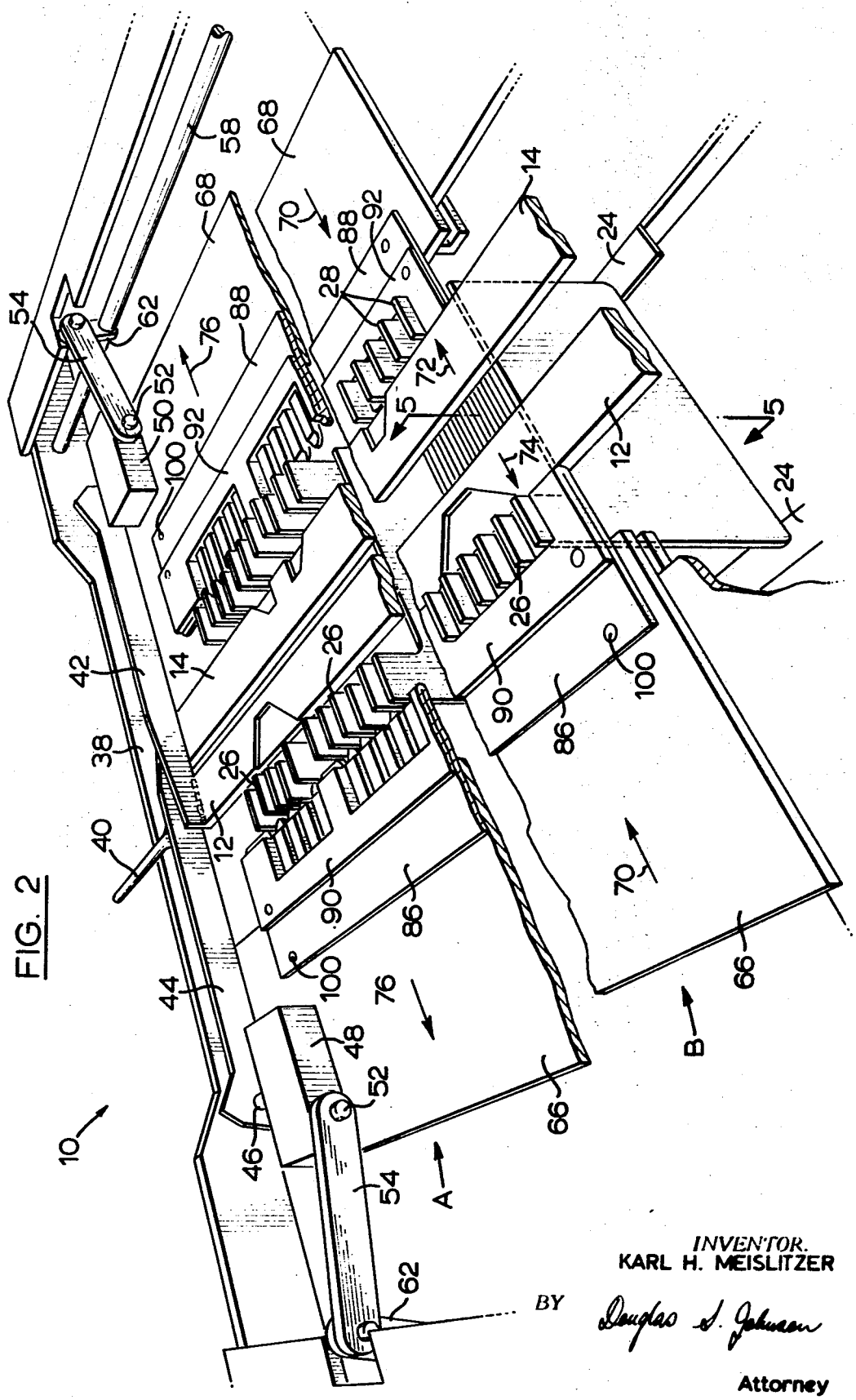
FIG. 2 is a detailed drawing showing the top of the apparatus of this invention; and shows in portions 2A and 2B respectively the cooperative relationship of various of the elements of the machine with the battery elements of the battery being assembled therein, before and after the operation of one of the machine steps taken on the apparatus.
Figure 3:
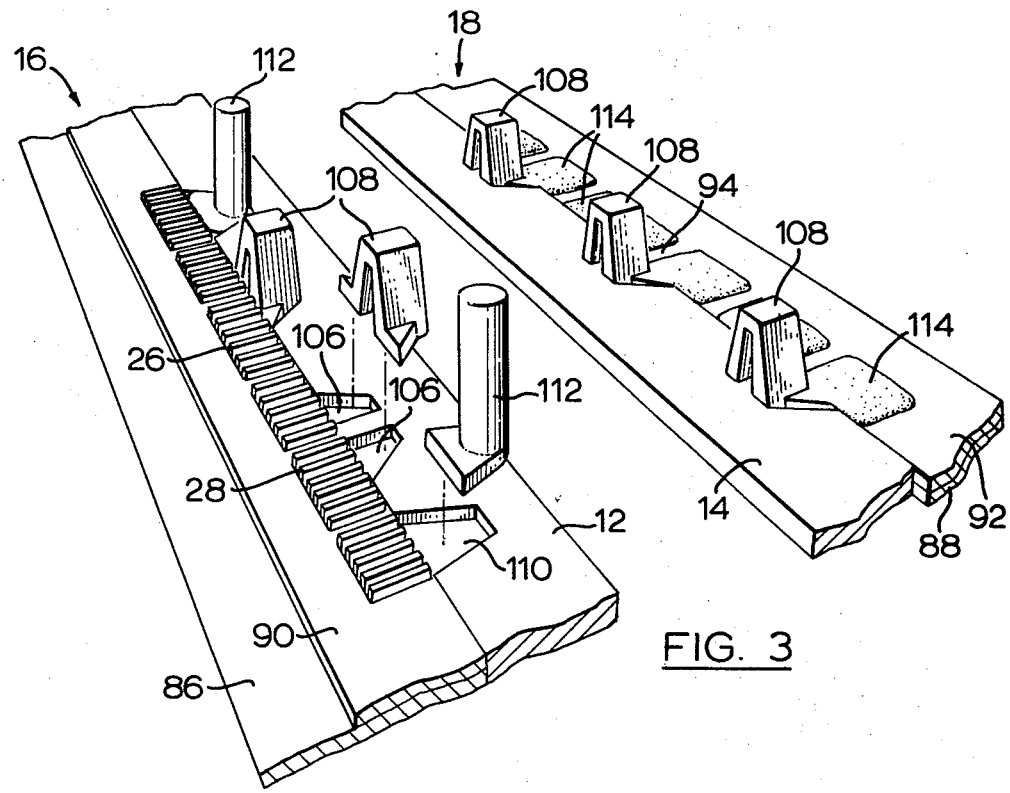
FIG. 3 is a detail, partially exploded, of a portion of the top of the apparatus of this invention, and shows the relationship of the intercell connectors and the battery posts to the plate lugs both before and after burning, and the bus bars formed by the burning operation.
Figure 4:
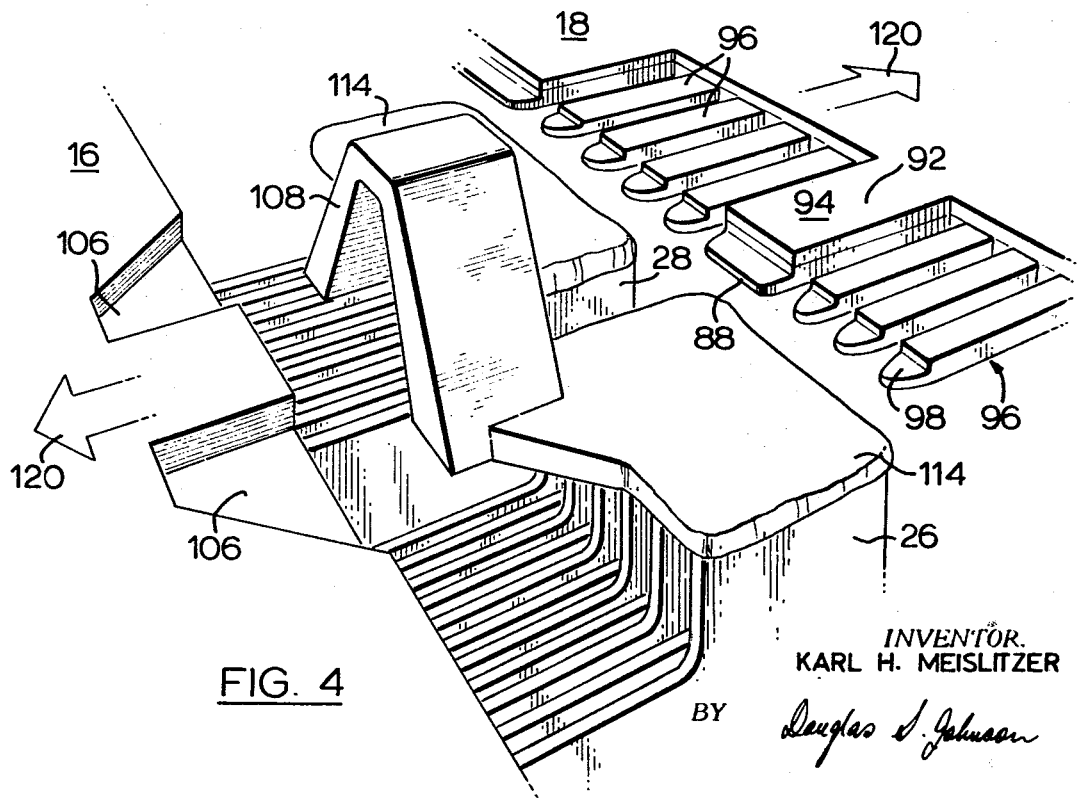
FIG. 4 is a detail, drawn to a greater scale, of an intercell connector and bus bars formed on the plate lugs of two adjacent cell groups.

It is convenient to consider the apparatus as having an entry end and an exit end; these terms being with reference to the passage through the apparatus of the battery boxes into which the battery cell groups are assembled. Thus, FIG. 1 is a view of the machine looking at the exit end thereof, while FIG. 1A is a partial view of a portion of the top of the machine looking at the entry end thereof. Each of FIGS. 2, 3 and 4 is looking in the same direction as FIG. 1A, that is, at the entry end of the apparatus.

As stated, the assembly portion of the apparatus is the upper portion thereof. In that upper portion, there are a plurality of separator jig plates 20 which are spaced one from another and which have wall thicknesses identical to those of the cell separators formed in the battery box into which the assembled cell groups formed in the apparatus 10 are to be placed. That is, the plurality of assembly jig plates 20 virtually dimensionally duplicates, at least lengthwise through the machine, a specific battery box. It will be noted that the battery jig plates 20 have slots 22 formed therein, and these slots 22 will be discussed in greater detail hereafter. A pair of ledges 24 extends into the interior of the apparatus, as shown most specifically in FIGS. 2 and 5, and these ledges serve to divide the apparatus into the upper and lower portions as discussed above. The ledges 24 are positioned beneath the dams 16 and 18 a sufficient distance that battery plates, when assembled into the apparatus, will be properly positioned so that the plate tabs or lugs extend beyond the dams 16 and 18 in a manner to be discussed in greater detail hereafter.

The step-by-step assembly of a lead-acid storage battery using the apparatus of this invention will now be described. The purposes and features of various of the elements of the apparatus will become clear during the following description, and the cooperation of the elements of the apparatus will be shown.

It has been stated above that the battery whose assembly is illustrated in the drawings is a 12-volt battery having six interconnected cell groups, and that each of the cell groups comprises six negative plates and five positive plates with separators between adjacent plates. It is immaterial to this invention whether or not the cell groups are put together at another place and delivered to the operator of the apparatus 10, or whether the operator has to assembly the cell groups at his station. The negative and positive plates for the batteries are made in different plants or in different places in the same plant, and most often a standard collating machine will assemble the negative and positive plates together with the separators in groups having the required number of each. In any event, each cell group is assembled so that the negative plates have lugs 26 at one side of the group, and the positive plates have lugs 28 at the other side of the group.

Figure 5:
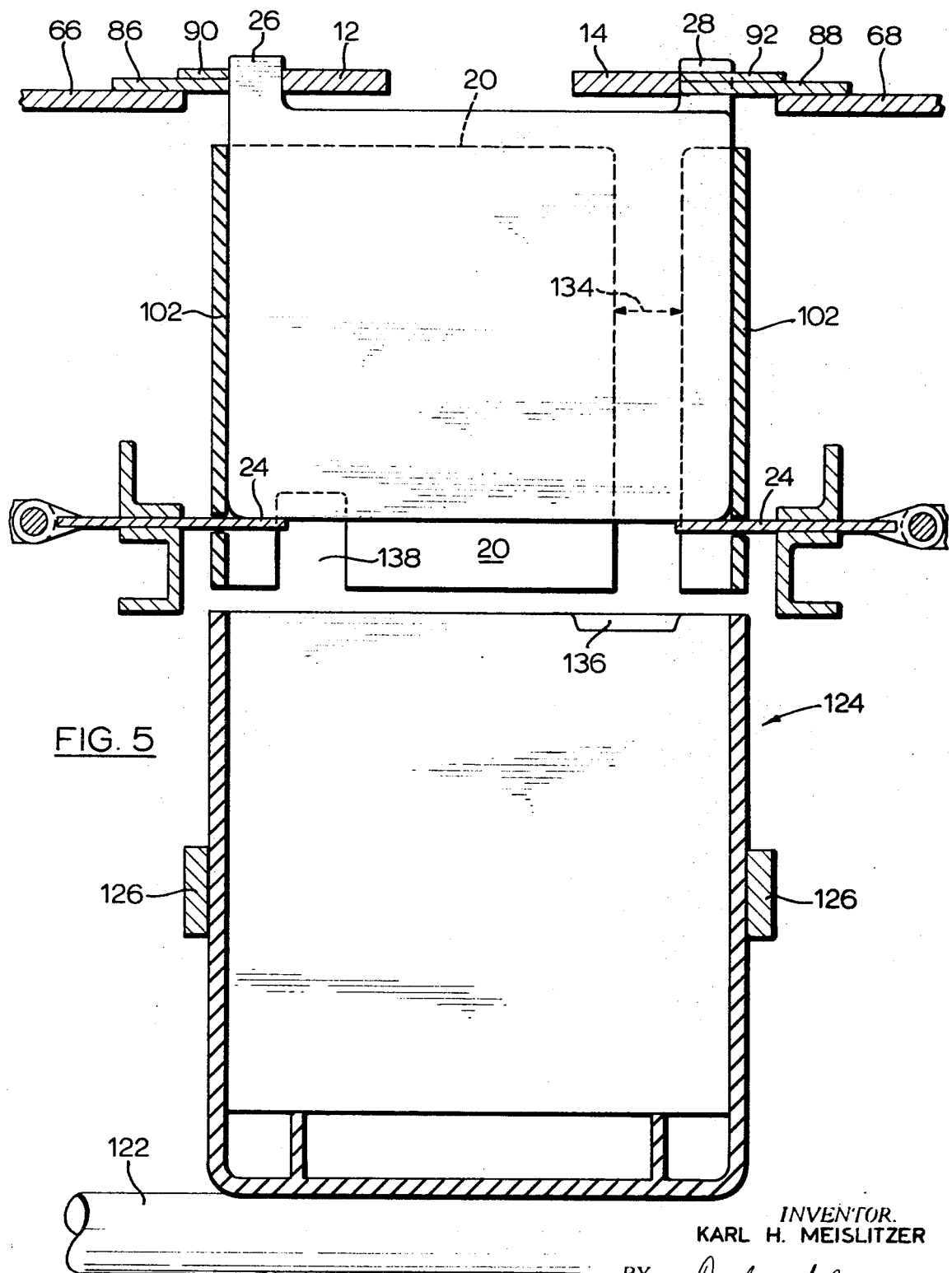
FIG. 5 is a section taken through the apparatus of this invention in the direction of the arrows 5-5 in FIG. 2.

The first step in the assembly of the lead-acid storage battery is the placing of the cell groups into the upper portion of the apparatus 10 so that one cell group is placed between each pair of jig plates 20. Before any of the cell groups is placed into the pockets between the jig plates 20, the operator assures that the ledges 24 are extended into the interior of the apparatus by operating the handle 30 which is mechanically linked through linkages 32 and 34 to the ledges 24. The ledges 24 support the cell groups in the pockets of the upper assembly and burning portion of the apparatus 10 as illustrated in FIGS. 2 and 5. The cell groups are placed into the pockets so that groups of negative plate lugs 26 and groups of positive plate lugs 28 are alternately spaced along either side of the apparatus, as will be discussed in greater detail hereafter.

When all of the cell groups are placed and properly oriented in the pockets in the upper portion of the apparatus, the guides 12 and 14 are closed over the top of the assembled cell groups. The guide 14 is brought down first, and is supported over the ends 38 of the apparatus by support rods 40 which are securely fastened to the edges of the guide structure 14. Guide 12 is then brought down over guide 14 and is supported by it, so that its sidearms 42 ride on and are supported by the guide 14. (It should again be noted that FIG. 2 is looking at the machine in the opposite direction to FIG. 1.)

It will be noted that the sidearms 44 of the guide structure including the guide 14 are hinged at pins 46, only one of which is visible in FIG. 1 and FIG. 2; and the sidearms 42 of the guide structure including the guide 12 are similarly hinged. Each of pins 46 extends into a block 48, and a similar pair of blocks 50 is provided having similar cooperation with the sidearms 42. Extending into the blocks 48 and 50 are pins 52, one in each block; and a linkage 54 extends away from each block and the pin 52 which extends through the ends thereof. A rod 56 extends between the ends 38 on one side of the apparatus 10, a similar rod 58 extends between the ends 38 on the other side of the apparatus. A handle 60 is fixedly attached to an extension of rod 58 which extends beyond one of the ends 38 as shown in FIG. 1. Each of the linkages 54 is connected through additional linkages 62 to the rods 56 or 58, so that the pair of linkages 54 and 62 on the side of the machine having the guide 14 is connected to the rod 56; and the pair of linkages 54 and 62 on the side of the machine having guide 12 is connected to the rod 58. The rods 58 and 56 are in turn connected by a linkage 64 at the entry end of the apparatus 10 as illustrated in FIG. 1A. The blocks 48 are securely fastened to a plate 66 and the blocks 50 are securely fastened to a plate 68.

It will be seen that manipulation of the handle 60 causes rotation of the rod 58, and by virtue of the linkage 64, a similar rotation of the rod 56. When the handle 60 is moved clockwise—as it is viewed in FIG. 1—rotation of each of the rods 56 and 58 is accomplished such that the linkages 62 and 54 force the blocks 48 and 50 respectively, and thereby the plates 66 and 68, to move inwardly away from the outside edges of the apparatus 10 and towards the center thereof. This motion is illustrated, and indicated by arrows 70, in FIG. 2, part B. It will be seen that, because of the construction of the apparatus, motion inwardly of the plates 66 and 68 accomplishes motion inwards of the guides 12 and 14; that is, the guide 12 moves away from the edge of the apparatus 10 from which it is swung on its sidearms 42, as indicated by arrow 72 in FIG. 2, part B. In similar fashion the guide 14 moves as indicated by arrow 74 in FIG. 2, part B. At the same time as the guides 14 and 12 are moved, so too are the dams 16 and 18 which are securely fixed to plates 66 and 68 respectively.

Reverse manipulation of the handle 60, i.e. counterclockwise as it is seen in FIG. 1, will cause the reverse rotation of each of rods 58 and 56, and thereby motion of the plates 66 and 68 in the direction as shown by arrows 76 in FIG. 2, part A; and similarly, motion of guides 12 and 14 and dams 18 and 16 in reverse directions to the arrows 74, 72 and 70.

It should be noted that when the cell groups of battery plates are first placed in the pockets in the upper portion of the apparatus 10, the edges of the plates in the cell groups may be staggered, which is to say that the edges of the plates of any of the cell groups may not be in a straight line. This is illustrated in FIG. 2, part A, where it is noticed that the edges of the various groups of plate lugs 26 and 28 are staggered. It should be further noted, however, that the height of the plate lugs 26 and 28 should all be substantially the same in each group, since each of the plates should be firmly supported from the ledges 24.

It will also be noted that the first group of plate lugs on the left-hand side of the apparatus, as viewed in FIG. 2, in a group of positive plate lugs, that the next group is a group of negative plate lugs and so on, and that the last group is a group of negative plate lugs. Thus, within the upper portion of the apparatus 10, the cell groups are placed so that along each side the groups of plate lugs presented thereat are alternatively positive and negative so that the intercell connections may be easily accomplished as is described in greater detail hereafter.

When the cell groups are all in place and the guides 12 and 14 positioned as shown in part A of FIG. 2 and as discussed above, the handle 60 is manipulated so as to move the plates 66 and 68 and with them the guides 14 and 12 towards the plate lugs 26 and 28 as described by arrows 70, 72 and 74, and as discussed above. The guides 12 and 14 then butt against the inside vertical edges of the plate lugs 26 or 28, and the plate lugs are positioned by dams 16 and 18.

The positioning of the plate lugs 26 and 28 by the dams 16 and 18 is such as to securely hold the plate lugs in place and to ready them for the burning operation which will be made as the assembly of the battery proceeds. It will be noted that each of the dams 16 and 18 has a first plate 86 and 88 respectively. Over the plates 86 and 88, and securely fastened thereto, are further plates 90 and 92 respectively. Looking briefly at FIG. 4, it will be noticed that the guide 14 and dam 18 are shown therein; and with respect to the dam 18 it will be noted that the plate 92 overlies the plate 88 only in those places such as that designated at 94 which will be aligned between groups of plate lugs belonging to individual cell groups. The plate 88 has formed therein a number of teeth 96 which may have an undercut nose area 98 in front thereof as illustrated. The teeth 96 are of sufficient dimension to fit between adjacent plate lugs, so that the width of each of teeth 96 is approximately the width of one plate plus two plate separators. It can be seen that the number and spacing of the teeth is dependent upon the type and rating of the battery being assembled at any time using the apparatus of this invention; and to this end, and to accommodate easy replacement of the dams 16 and 18, bolts 100 are provided which secure the dams to plates 66 or 68.

It will be seen in FIG. 2, part B, and FIG. 5 that each of the groups of plate lugs 26 and 28 in any cell group is securely held by one of the guides 12 or 14 together with one of the dams 16 or 18. The vertical members 102 in FIG. 5 are shown to be intimately arranged at the edges of the plates in the cell group, but it is not necessary that the members 102 be quite as closely spaced to the plates as is shown. In any event, when the guides 12 and 14 are extended to their limit against the plate lugs in all of the assembled cell groups, the battery elements are then ready for the next burning step in the assembly process of the lead-acid storage battery.

Turning to FIG. 3, the left-hand side of that FIGURE shows the guide 12 butting against the groups of plate lugs 26 and 28 which are held in dam 16 by the plates 86 and 90. In each of the guides 12 and 14 there is formed a plurality of pairs of indents 106 into which the legs of a preformed intercell connector 108 are fitted in the manner shown in FIG. 3. Each of the intercell connectors 108 is of a "loop-over" type, and is of a somewhat inverted V-shaped form, having feet extending from the outer edge at the bottom of each of the legs. There is also formed in the guide 12 a pair of indents 110 which are placed opposite each of the endmost groups of plate lugs facing the guide 12, and the indents 110 are shaped so as to receive the battery posts 112 which are placed therein. It is noted that the depth of the indents 106 and 110 is sufficient only to support the intercell connectors 108 or the battery posts 112 in position opposite the relative groups of plate lugs for the burning operation to be described hereafter.

The right-hand side of FIG. 3 shows the guide 14 and three intercell connectors 108 supported thereby but after the burning operation has been made on that side of the battery which is being assembled. It has previously been remarked that the burning operation normally comprises bringing the flame of a torch into contact with the exposed groups of plate lugs and directing the torch at the plate lugs so that they melt. There is normally not sufficient material in the exposed ends of the plate lugs to form the bus bars 114 across the top of the plate lugs, and a bar of lead material of the same or approximately the same alloys as the plate lugs is also exposed to the open flame to add sufficient material. The interrelationship between the teeth 96 and the plate lugs is such that the molten metal during the burning operation will not run downwards past the teeth 96, and there is therefore no chance that a short circuit may develop between adjacent negative and positive plates. It will be seen, especially with reference to FIG. 4, that the bus bars 114 are formed across the tops of the groups of plate lugs 26 or 28, and that the intercell connector 108 (or the battery post 112) is securely attached to the bus bars 114 and thereby to each of the groups of plate lugs 26 and 28 in adjacent cell groups. The series connection of the cells within the battery is thereby achieved.

It is particularly convenient to form the bus bars 114 and to make the intercell connections using the intercell connectors 108 and to place the battery posts 112 so that the intercell connectors 108 and the battery posts 112 connect to the respective groups of plate lugs 26 or 28 at the inner edges thereof. That is, when the bus bar 114 is formed, as is particularly shown in FIG. 4, the intercell connectors 108 or the battery posts 112 are physically opposed above the tops of the battery plates and beside but to the inside of each of the bus bars 114. To accommodate this arrangement, the indents 106 and 110 which are formed in the guides 12 and 14 have a depth such that the bottom of the feet of any of the loop-over intercell connectors 108 or battery posts 112 is substantially at the same elevation above the battery plates as the bottom of the bus bar 114 formed during the burning operation.

It will be seen that when the burning operation is completed, the entire series connection of the cell groups within the battery is achieved, the battery posts are installed, and all of the bus bars within each of the cell groups is made. In effect, therefore, the working parts of the lead-acid storage battery are assembled, and need only to be placed in a battery box together with an electrolyte intercell a battery box cover in order to have a completely assembled battery. However, it is obvious that the assembled cell groups, intercell connectors and battery posts after the burning operation are rigidly held in the upper portion of the apparatus 10. It is therefore necessary to reverse the operation and manipulation of the handle 60 so as to remove the guides 12 and 14 and the dams 16 and 18 together with the plates 66 and 68 away from the assembled battery components. As noted, the plates 66 and 68 move in the direction of arrows 76 in part A of FIG. 2 (and of arrows 120 in FIG. 1); following which the guides 12 and 14 are swung up and away from the assembled battery components so as to again assume their position illustrated in FIG. 1.

It will be noted that the lower portion of the burning and boxing apparatus 10 is adapted to permit the passage therethrough of battery boxes across a plurality of rollers 122. A battery box 124 is shown in FIG. 5 between spaced side runners 126 which assure that the battery box is properly positioned laterally within the apparatus. An elevatable stop 128 is arranged at the exit end of the apparatus as illustrated in FIG. 1; and the stop 128 is so positioned that the battery box 124 is properly positioned axially within the apparatus 10 when it is retained by the stop 128. For matters of convenience, a counting mechanism 130 having a striking arm 132 is mounted beyond the exit end of the apparatus so as to count and indicate the number of lead-acid storage batteries which are being assembled in the apparatus.

It will be seen that in order to place the assembled battery elements into the battery box 124 when it is properly positioned in the lower part of the apparatus, it is necessary to withdraw the ledges 24 and to push the assembled and interconnected cell groups downwardly through the upper portion of the apparatus past the jig plates 20 and into the waiting battery box 124. In order to accomplish this, and to permit the intercell connectors to move downwardly into the battery box, slots or cutouts 134 are provided in each of the jig plates 20 in a position and of such a width so that the respective one of the intercell connectors 108 can move downwardly through the slot and past the jig plates. An indent 136 may be formed in each of the cell separators within battery box 124 to permit the intercell connector 108 to loop over the cell separator when installed in the battery box. A series of indents 138 is formed along one side and at the bottom of the jig plates 20 so as to permit passage therethrough of the battery posts 112 as the assembled battery box is removed from the apparatus 10.

When the battery box 124 is removed from the apparatus 10, together with the preassembled cell groups, intercell connectors, battery posts, etc. which are in place within the battery box, there remains only to place a battery box cover over the box and to fill the same with electrolyte in order to complete the battery assembly. Charging of the battery plates may then be required, depending on whether or not the battery plates comprising the cell groups were preformed or not; that is to say, depending on whether or not the battery is intended to be a 'dry-charged' battery or a standard wet battery when shipped.

It will be seen that the apparatus 10 is illustrated and described above is readily adapted to automation. For example, simple hydraulic means can be installed on the machine to raise and lower the guides 12 and 14 and to close them against the plate lugs by moving forward the plates 66 and 68. Automatic burning apparatus can be adapted to the apparatus of this invention, as can automatic placing apparatus both for the cell groups and for the intercell connectors and battery posts. Water channels can be formed within the dams 16 and 18, and particularly within the plates 90 and 92 to provide for faster heat dissipation and thereby faster solidification of the molten lead alloy forming the bus bars 114 during the burning operation.

No matter whether the apparatus of this invention as illustrated and described is automated or not, it can be clearly seen that the use of this apparatus provides great economies in the manufacture of lead-acid storage batteries by permitting all of the assembly and burning steps to be made at one station and thereby cutting down on handling and labor costs as well as improving the reject rate. It is also seen that the apparatus can be readily adapted to accommodate the assembly of any lead-acid storage battery. At the most, all that would be required would be to change the dams 16 and 18 merely by replacing the plates 86 and 88 together with plates 90 and 92 which are fastened respectively thereto. Also, the height and spacing of the jig plates 20, ledges 24 and battery box guides 126 and guides 102 may have to be altered. These dimensional alterations within the apparatus, however, are readily accomplished by merely loosening and tightening of a few nuts and bolts and moving the various machine integers as required. Preferably the various machine integers which would be moved to accommodate the apparatus to different batteries to be assembled therein would be indexed for easy adjustment.

The embodiments of this invention in which I claim an exclusive property or privilege are defined as follows:

1. In an apparatus for the assembly of lead-acid storage batteries, the combination comprising:
   means for receiving and releasably retaining groups of battery plates, each plate of each of said groups having a lug formed thereon extending above the top of said first-mentioned means;
   dam means having teeth means formed therein and comprising a pair of opposed plates on either side of and above said first-mentioned receiving means, and adapted to move laterally in a direction across said first-mentioned receiving means so that the teeth formed in each of said dam means cooperate with said lugs formed on said battery plates;
   the height of said lugs on said battery plates also being sufficient to extend above the upper surface of said dam means, and all of the plates in any of said groups of plates being oriented so that the positive and negative plates are alternately phased, and so that all of the positive plate lugs are on one side of said group and all of the negative plate lugs are on the opposite side of said group so as each to cooperate with one of said dam means respectively;
   guide means swingably adapted to overlie said first-mentioned receiving means and to move laterally with said dam means against the inside edges of said groups of plate lugs;
   movable stop means associated with said first-mentioned receiving means to releasably retain said groups of battery plates therein, and to permit downward motion of said groups of battery plates therefrom upon actuation of said movable stop means;
   and means beneath said first-mentioned receiving means to accommodate a battery box positioned thereat, and to permit movement of said battery box through said apparatus.

2. The apparatus of claim 1 wherein said dam means comprise first and second plate means having said teeth means formed in said first plate means and cutouts formed in said second plate means to conform to the dimensional limits of each of the areas in said first plate where said teeth means are formed.

3. The combination according to claim 2 wherein channel means are formed in said dam means to accommodate the flow of cooling liquid therethrough.

4. The combination according to claim 1 wherein said guide means are swingably mounted with said dam means, and wherein each said guide means has indents formed therein to accommodate the foot portion of one of the group comprising battery posts and intercell loop-over connectors.

5. The combination according to claim 4 wherein said first-mentioned receiving means comprises a plurality of vertically oriented jig plates to define a plurality of cells each adapted to receive one of said groups of battery plates, and wherein each of said vertically oriented jig plates has a slot formed from the top to the bottom thereof near one side thereof to accommodate the downward passage of a loop-over intercell connector joined from a first group of plate lugs in a first cell to the first group of plate lugs in a second cell on either side of any one of said jig plates respectively.

6. The c0mbination according to claim 5 wherein each of said loop-over intercell connectors is substantially V-shaped and is of substantially the same material as the plate lugs intended to be joined thereby.